United States Patent Office 3,081,278
Patented Mar. 12, 1963

3,081,278
THERMOSETTING AMINE RESINS MODIFIED WITH A POLYESTER AND A POLYACRYL-AMIDE
Henry P. Wohnsiedler, Noroton, Conn., assignor to American Cyanamid Company, New York, N.Y., a corporation of Maine
No Drawing. Filed June 16, 1958, Ser. No. 742,005
18 Claims. (Cl. 260—45.3)

This invention relates to novel thermosetting resinous compositions, particularly useful in molding, laminating and other related arts. More particularly, this invention relates to heat-curable resinous compositions comprising a predominant proportion of an amino-aldehyde resin and a modifier therefor, said modifier being a combination of a resinous esterification product containing unesterified hydroxyl groups and a substantially homopolymeric material including polyacrylamide and methylol derivatives thereof. Still more specifically, this present invention concerns novel resinous compositions comprising formaldehyde condensation products of melamine or urea modified with a combination of a phthalic glyceride and a water-soluble polyacrylamide or water-soluble or insoluble methylol derivative of polyacrylamide and to the cured products of these compositions which exhibit a plurality of unusual advantages.

This application is a continuation-in-part of copending application Serial No. 466,440, filed November 2, 1954, now Patent 2,841,571.

It is an object of this invention to prepare novel thermosetting resinous compositions for molding purposes.

Still further, it is an object of this invention to provide novel resinous compositions whose cured products exhibit a high degree of dimensional stability and excellent translucency properties, among a plurality of other improved properties.

Another object of the present invention is to prepare molded articles from themosetting resinous compositions comprising melamine-formaldehyde, urea-formaldehyde, or urea-melamine-formaldehyde condensates, modified with a combination of an esterification product of a dicarboxylic acid and a polyhydric alcohol with water-soluble or insoluble thermoplastic materials derived from acrylamide or methylolated derivatives thereof.

A still further object of the invention is to obtain resinous laminating syrups which, when employed to produce laminates, result in cured products exhibiting excellent post-formability characteristics.

These and other objects of this invention will be apparent to those skilled in the art, especially upon consideration of the detailed discussion and examples presented hereinbelow.

In the field of molded thermosetting aminoplasts, the use of melamine or urea resins has resulted in molded products which exhibit relatively good resistance to crazing or cracking, a type of failure which results from stresses developed in the molded article, possibly during the molding operation, but more prevalently occurring in a use period subsequent thereto. Urea-formaldehyde molding compositions are more prone to failures of this type than those compositions wherein the amide-bearing component is a symmetrical triazine such as melamine. Nevertheless, in spite of the generally good properties associated with these moldable condensation products in this regard, there is an existing need for improving the dimensional stability of cured aminoplasts generally for use in certain types of molding applications. For instance, many applications require the molding of the aminoplast composition into a unitary object consisting of integral sectional parts varying in thickness. This variation in thickness of the component sections or parts is directly related to the tendency of the molded object toward developing internal stresses which in turn manifest themselves as crazing and cracking failures.

The term "dimensional stability" as applied in the art of molding contemplates two fundamental types of dimensional changes. One type is known and characterized as mold shrinkage, which as its name implies is the difference in dimensions which develops between the cooled mold, usually a metallic form, and the cooled molded object formed therein. This dimensional difference is caused principally by differences in thermal coefficient of cubical expansion between the metallic mold form and the molded resinous composition. Mold shrinkage is not particularly objectionable because of the uniform manner in which all of the sections of the molded article contract. Moreover, mold shrinkage can usually be compensated for by mold design, and thus the use of mere mechanical expedients largely offsets any deleterious effects that may be caused by this shrinkage phenomenon.

The other dimensional change confronted in the molding of aminoplast type compositions, and one with which this invention is particularly concerned, is contraction in dimension due to other causes than the dimensional changes induced by the thermal gradients mentioned above. This second type of dimensional instability is referred to as aging shrinkage since it occurs during use of the molded fabrication. This adverse type of shrinkage is believed to be directly influenced by the moisture content of the molded object. The moisture content of a molded article is usually made up of the free moisture associated with the molding composition and moisture generated through progressive condensation during high temperature aging of the molded part, and in some instances includes moisture adsorbed by the molded part. Aging shrinkage is considered very objectionable in the molding art because indications are that it results in the crazing and cracking failures mentioned above. The tendency toward such failures is particularly pronounced in molded objects which are in the form of unitary articles having component sections varying considerably in thickness. In such articles, it can be readily appreciated that in the course of time under particular conditions, the free moisture will escape more readily from the thinner portions of the molding than from the bulkier portions, and every indication induces those skilled in the art to believe that when a state of moisture imbalance is reached so as to cause dimensional instability, the system will adjust to relieve itself of built-up dimensional stresses in a form of cracking or crazing.

Various methods have been suggested in the prior art for improving the dimensional stability of amino-aldehyde type resins, particularly the type of instability due to moisture influences. Thus, for example, it has been suggested that melamine-formaldehyde resins be modified with certain unrelated polymeric ingredients which do not coreact to any appreciable extent with said amino resin base but, nevertheless, functionally cooperate therewith, thus resulting in a composition less sensitive to moisture influences than the amino resin base. Among such modifiers which may be mentioned are polymethylacrylate, polyacrylonitrile, copolymers of acrylonitrile with certain alkyl acrylates or N-mono-(lower alkyl) acrylamides, copolymers of acrylonitrile and acrylamide, and the like. Additionally, reference is made to the copending application of H. P. Wohnsiedler et al., Serial No. 685,404, filed September 23, 1957, now abandoned, wherein is disclosed resinous compositions whose cured products exhibit excellent dimensional stability properties. The compositions of said application comprise amino resins modified with polyacrylamide or methylol derivatives thereof.

The use of polyester resins to modify an amino resin is also known and is disclosed and claimed in U.S. Patent No. 2,479,090 to Wohnsiedler. Melamine resins modified with polyester resins in accordance with said patent exhibit improved toughness, cure and molding properties in general.

It is in regard to the above-mentioned patent and the above-referred-to pending application that this present invention is particularly concerned. I have now discovered that when an esterification product such as described in the above-mentioned patent is used in conjunction with a polyacrylamide or methylol polyacrylamide as exemplified in the above-referred-to pending application to modify an amino-formaldehyde resin, an unusual combination of beneficial properties is obtained for the composition which may not be obtained by the use of either one of these modifier components alone. The two modifying components used in accordance with this invention serve to complement each other in certain respects. As shown and discussed in detail in said Wohnsiedler et al. application, polyacrylamide and methylol polyacrylamide in combination with an amino-formaldehyde resin will markedly increase the dimensional stability of the amino resin, with the result that such modified compositions exhibit low levels of aging shrinkage. When these thermoplastic modifiers are employed, this improvement in aging shrinkage is obtained in spite of the fact that the modifiers are essentially hydrophilic in character. As explained hereinabove, with regard to the factors causing dimensional instability of aminoplasts, one would expect that polymers of acrylamide would deleteriously affect this particular stability characteristic. However, the reverse was discovered. It was speculated that the higher than normal level of moisture associated with compositions containing a material such as polyacrylamide was tenaciously held within the composition after curing, because of a hydrogen bonding phenomenon attributed to the polyacrylamide component of the composition.

In addition to imparting dimensional stability to the aminoplast composition, the thermoplastic polymers, because of their relatively low heat distortion temperature, considerably lower the inherent heat distortion temperature of the amino-formaldehyde resin and therefore produce in the latter the effect of greater elasticity or lower modulus of elasticity and greater deformation at temperatures of 140–160° C.

While the beneficial properties imparted by the use of a thermoplastic resin such as polyacrylamide were extremely significant, there nevertheless was a disadvantage resulting from the use of this type of modifier. The most conspicuous disadvantage was the thermoplastic polymers' adverse effect upon the normally excellent flow properties of the amino resin. Thus, for example, polyacrylamide-modified amino resin molding compositions, while excellent with regard to dimensional stability characteristics, could only be satisfactorily employed to make moldings for industrial applications at higher than conventional molding pressure because the flow characteristics associated therewith were inadequate to give molded products, using normal pressures, which had good decorative appearance. Consequently, these modified compositions could not be used to prepare certain molded items where decorative appearance was of prime importance, even though a high degree of dimensional stability was required of such fabrications.

Modification of amino resins with polyesters as exemplified in U.S. Patent No. 2,479,090 permits the preparation of molding compositions which, when molded, exhibit a fair degree of dimensional stability, good decorative molded appearance but reduced light transmission, and a considerable improvement with regard to flow during molding and resistance to cracking around molded-in inserts. The latter two beneficial properties imparted by the polyester were by far the most salient contributions resulting from the use of this type of modifier.

While the normal flow properties associated with the amino-formaldehyde condensate were mentioned hereinabove as good, the polyester modifier, nevertheless, enhanced this property. The most noticeable disadvantage associated with the use of a polyester to modify an amino resin was the reduction in translucency or light transmission of molded articles prepared from these modified compositions. When the polyester modified compositions were thoroughly cured, a system of limited compatibility was obtained which adversely affected the light transmission properties of the plastic. In order to have good decorative properties, as recognized in the art, a molding must possess a good degree of translucency. This degree required might be expressed as that degree usually associated with moldings prepared from the unmodified amino resin.

The present invention basically resides in the discovery that when a thermoplastic polymeric material such as polyacrylamide is used in combination with a material such as diglyceryl phthalate, the two modifiers beneficially complement each other. As a result, an aminoplast composition for molding purposes exhibiting a plurality of improved properties is obtained which, at the same time, does not possess the untoward effects that are known to be caused by or inherently associated with the respective individual modifier component. The reason for this unexpected result is believed to be quite simple, namely that the amino resin-thermoplastic polymer-polyester combinations of this invention are relatively homogeneous and compatible systems.

The unusual and synergistic effect of the combinations of this invention in modifying an amino-formaldehyde resin now permits the preparation of molded articles which exhibit a high degree of dimensional stability and in addition have excellent decorative appearances. Applications wherein such a desirable combination of properties is required include components of electrically operated home appliances, telephone hand sets, cutlery handles, pot handles, and kitchen equipment assemblies normally subject to heat, where good decorative appearance is a prime consumer requirement.

The thermosetting amino-aldehyde resins which, when modified with polyacrylamide or methylolated derivatives of polyacrylamide in combination with a polyester containing unesterified hydroxyl groups constitute the novel resinous molding compositions of this invention, may be prepared by reacting an aldehyde with an amidogen compound. The term amidogen employed herein contemplates compounds containing an aldehyde-reactable amido or amino group or groups. The preferred amidogens that can be used to prepare amino-aldehyde condensates useful in the molding compositions of this invention are melamine, urea and mixtures thereof. However, while the preferred amidogens are those mentioned hereinabove, it is to be understood that other amidogens may be employed. Illustrative examples of other amidogens that may be used solely, or preferably in combination with the preferred amidogens wherein the preferred type constitutes the major portion of the amide-bearing components, are triazines containing at least one amino group, i.e., —$NH_2$, but preferably more than one, and at least two imino groups, i.e., —NH, but preferably more than two, e.g., benzoguanamine, acetoguanamine, formoguanamine, 2-amino-1,3,5-triazine; 2,4,6-tris(monoalkylamino)-1,3,5-triazines [e.g., 2,4,6-tris(ethylamino)-1,3,5-triazine], 2-monoarylamino, 4,6-diamino-1,3,5-triazines [e.g. 2,4-diamino-6-phenylamino-1,3,5-triazine], melam, melem, melom, 2-chloro-4,6-diamino-1,3,5-triazine, 2-amino-4-hydroxyl-6-phenyl-1,3,5-triazine; 2,4-diamino-6-methylamino-1,3,5-triazine, ammeline, ammelide, and the like. In addition to these triazine amidogens, one may use diazine amidogens, such as 2,5-diamino-1,3,4-thiadiazine, singly or in combination with said triazines. Also it is contemplated that other amidogens, such as certain guanazoles, e.g. guanazole, guanazo-guanazole, and biguanides, such as phenyl biguanide, may be used. Of the ureas, carbamide or urea is preferred; however, thiourea, biuret, and dicyandiamide may be used singly or in combination with urea or in combination with the amidogens mentioned hereinabove. However, as mentioned previously, the preferred amidogens to be used in preparing the condensation products useful in the present invention are melamine, urea, or combinations thereof.

The thermosetting amino-aldehyde condensates employed in the compositions of the present invention may be derived by effecting condensation of the aldehyde reactant with the amidogen. The ratio of aldehyde to the aldhyde-reactable amidogen can be varied over a wide range depending, for example, upon the number of aldehyde-reactable amide or amino groups in the amidogen and upon the particular properties desired in the final condensation product. The aldehyde, for example, formaldehyde, can be used in an amount sufficient to react with from one to all of the reactive hydrogens of the amido or amino groups in the amidogen. Thus, one can use, for instance, from 1 to 6 mols of the aldehyde per mol of amidogen when the amidogen compound consists of melamine. When one employs either benzoguanamine or urea, one may employ 1 to 4 mols of aldehyde per mol of said amidogens. The preferred molar ratios of aldehyde to amidogen are 1.0–3.0 when the amidogen is melamine, and 1.0–2.0 when the amidogen employed is benzoguanamine or urea.

The initial condensation reaction between the aldehyde, specifically formaldehyde, and the amidogen may be carried out at normal or at elevated temperatures, at atmospheric, sub-atmospheric or super-atmospheric pressures, and under neutral, alkaline or acid conditions. However, it is preferred that the polymerization and dehydration be effected under pH conditions in the range of pH 7.0–11.0 and preferably in the range of pH 9.0–10.0 at a temperature from 25° C. to 105° C. When it is desired to carry out the condensation reaction under alkaline conditions, any substance yielding an alkaline aqueous solution may be used, for example, alkali metal or alkaline earth metal oxides, hydroxides or salts with weak acids. Specifically, one may use sodium, potassium or calcium hydroxide or sodium or potassium carbonate. Further, one may use mono-, di-, or trialkylamines, aqueous ammonia, etc., to effect alkaline conditions. Illustrative examples of acid condensation catalysts that may be employed are inorganic and organic acids such as formic, hydrochloric, phosphoric, acetic, lactic, phthalic, maleic, etc., or acid salts such as mono sodium phosphate, mono sodium phthalate, etc.

The condensation reaction between the amidogen and the aldehyde may be carried out in a single-stage operation as exemplified in British Patent No. 673,742, wherein all of the aldehyde to be employed is initially present with the amidogen. In the alternative, the condensation reaction may be carried out in multiple stages, that is, the aldehyde to be employed in the condensation reaction is added in fractional amounts of the total in separate stages. The said multiple-stage technique is disclosed in U.S. Patent No. 2,841,571, dated July 1, 1958, to Wohnsiedler. Further details showing the preparation of these condensates which are useful in practicing the present invention are contained in the specific embodiments set forth hereinbelow.

The condensation reaction between the amidogen and aldehyde may be carried out in an aqueous or non-aqueous medium; however, the employment of an aqueous medium is preferred. Suitable non-aqueous media are water-soluble alcohols, ketones and such polar materials as dimethylformamide, dioxane, tetrahydrofuran and the like. It is preferred that the amino resin be of the nonalkylated type; however, the use of slightly alkylated condensates or combinations of a major portion of unalkylated and a minor portion of alkylated amino resins are contemplated in this invention.

Formaldehyde or compounds engendering formaldehyde such as paraformaldehyde, hexamethylenetetramine and the like, comprise the preferred aldehydic component in the preparation of the thermosetting amino condensates useful in the compositions of this invention. Nevertheless, for certain applications it may be desirable to use aldehydes such as acetaldehyde, propionaldehyde, butyraldehyde, acrolein, methacrolein, crotonaldehyde, benzaldehyde, furfural, etc., mixtures thereof or mixtures of formaldehyde with one or more of the above-mentioned aldehydes.

The polyacrylamides that may be used in the practice of this invention are substantially homopolymeric materials ranging in molecular weight from about 5,000 (number average) to 1,500,000 (weight average). The polyacrylamides are characterized as substantially homopolymeric materials because in the present state of the art related to the preparation of these polymers there is obtained some degree of hydrolysis, usually to the extent not exceeding 6% of the amide groups present in the monomer subjected to polymerization. Polyacrylamides of controlled molecular weights can be obtained by polymerizing acrylamide in an aqueous medium containing approximately 5 to 40% by volume of a water-miscible alcohol in the presence of a catalyst such as hydrogen peroxide and potassium persulfate. Such a procedure is outlined in U.S. Patent No. 2,486,191. The polymerization of acrylamide may also be carried out in solutions of organic solvents. The polymerization of acrylamide in organic solvents is particularly adaptable for the preparation of polymers of low molecular weight. In general, lower reaction temperatures and more concentrated monomeric solutions result in polymers having higher molecular weight.

The number average molecular weight can be determined by osmotic pressure methods. The weight average molecular weight can be determined by the light scattering method (see P. J. Flory, Principles of Polymer Chemistry, Cornell University Press, 1953, pages 266–316).

Polyacrylamide of any molecular weight may be employed in the present invention. However, it is preferred that the lower limit of polymer weight be about 100,000 on a weight average basis because in the art of preparing polyacrylamide as is practiced at present there is a likelihood of free acrylamide being contained in very low molecular weight polymers. The presence of free acrylamide does not adversely affect the compositions of this invention; however, from hygienic considerations attending molding operations involving curing of the modified aminoplasts it is desirable that the polymers do not contain any substantial amounts of free monomeric acrylamide. The polyacrylamides having a molecular weight greater than the preferred limit, 1,500,000, can also be used. However, the use of extremely high weight polymers presents minor mechanical difficulties incident to the incorporation of the polymer into the aminoplast.

The methylol polyacrylamides can be prepared by reacting an aqueous solution of polyacrylamide with formaldehyde in the presence of basic catalysts, preferably in the pH range of from about 8 to 10. It is preferred that the pH be maintained in said range during preparation and processing into modified amino resin. In acidic media cross-linking and gelation tend to occur in methylol polyacrylamide solution. On drying, the polymer then becomes essentially insoluble, although it may remain swellable in water. The polymeric material prepared from such acid media may also be used in this invention. In strongly alkaline media, there is a tendency for the amide groups to be hydrolyzed.

In place of methylol polyacrylamide, the modifying polymeric material may be prepared by the α,α'-azoisobutyronitrile or other catalyst-induced polymerization of methylolacrylamide. Such polymethylol acrylamide recovered by formation in and precipitation from isopropanol, for example, can be used as a dry, finely divided powder or dissolved in aqueous solution.

The polyesters that may be employed in the modification of amino-formaldehyde resin in accordance with this invention are the esterification products resulting from the reaction of a polyhydric alcohol and a dicarboxylic acid. Details as to the preparation of these polyester resins are given in U.S. Patent No. 2,479,090, which is incorporated herein by reference.

The polyols that may be used include glycerol, pentaerythritol, dipentaerythritol, trimethylol ethane, trimethylol propane, ethylene glycol, propylene glycol, 1,4-butanediol, 1,5-pentanediol, etc. A trihydroxy polyol is preferred to prepare these polyesters. Among the many suitable types of trihydroxy polyols that may be used, glycerol is the preferred type primarily because of its low cost as compared to the other suitable polyols mentioned.

A number of dicarboxylic acids may be employed to prepare these polyesters. Specifically contemplated are such as phthalic acid, adipic acid, sebacic acid, terephthalic acid, succinic acid, isophthalic acid, butylidene bis benzoic acid, maleic acid, etc. The anhydride form of these acids, whenever available, may be used. The preferred acid is phthalic acid. Again, the preference for the particular type of dibasic acid stated is primarily predicated upon the current reasonable cost of this acid. Any one of the hereinabove mentioned dibasic acids may be used to prepare polyesters suitable for use in accordance with this invention. However, it is conceivable that any one of the acids mentioned may be preferred to prepare a polyester particularly adaptable for use in the aminoplast composition where special use applications are encountered.

As mentioned previously, the polyesters contemplated herein as modifiers should contain free or unesterified hydroxyl groups. I prefer to formulate these polyesters on the basis of approximately at least 1.5 moles of a trihydroxy or tetrahydroxy polyol to 1 mole of dicarboxylic acid. Such a ratio provides a safe margin for avoiding gelation in the polyester in the course of its preparation and insures an optimum amount of free hydroxyl for low acid number and at the same time for achieving the purposes of this invention. Thus it wil be obvious that the preferred minimum proportion of hydroxyl to carboxyl groups on the basis of reaction equivalents will be 2.25/1 for a glycerol polyester and 3/1 for a pentaerythritol polyester. While these ratios might be lowered under certain conditions, such as by including in the overall composition a minor content of a glycol with its equivalent in dicarboxylic acid thereby introducing into the polyester molecules a certain proportion of linear chains either as block type polymers or irregularly alternating monomer segments in the chains, these ratios represent the preferred minimum ratios for a polyol other than a glycol and its dicarboxylic acid coreactant. Where a glycol has been employed in this manner, suitable polyesters have been prepared having a hydroxyl to carboxyl equivalency ratio of about 2:1, respectively.

It is to be understood that the polyesters useful herein may be formulated on a basis exceeding the above-stated preferred minimum ratio of hydroxyl groups to carboxyl groups. Thus, for example, suitable products may be prepared by esterifying trihydric alcohols and alcohols having in excess of three hydroxyl groups with dicarboxylic acids wherein said condensates contain a hydroxyl to carboxyl ratio of six or even more.

The amount of the modified combination to be used in the practice of this invention can be varied over a wide range. It has been found that suitable compositions can be prepared from 95 to 55 parts of the amino resin and correspondingly from 5 to 45 percent of the modified combination. The preferred amounts of the modifying combination is between about 15 and 30 and preferred amounts of amino resin is correspondingly from 85 to 70.

The modifying component, that is, the combination of polyacrylamide or methylol polyacrylamide and the polyester resin may also be varied over a wide range. Thus, the modifier combination may range from 25 to 75 parts of the polyester and correspondingly, from 75 to 25 parts of the polyacrylamide or methylol polyacrylamide. The preferred ranges of components constituting the the modifier combination ranges from about 40 to 60 parts of polyester and correspondingly from 60 to 40 parts of the polyacrylamide or methylol polyacrylamide.

The method of combining the polyacrylamide or the methylol derivative thereof and the polyester resin with the amino-aldehyde resin presents no particular problem. It has been found that polyacrylamide and the polyester resin may be readily incorporated as an aqueous solution into the amino resin syrup at an early or late stage of reaction of said syrup, after which the resultant composition is homogeneously mixed and then dried. This method constitutes the preferred method of incorporating polyacrylamide and the polyester with the amino-aldehyde resin. Alternately, dry polyacrylamide or methylol polyacrylamide and the dry polyester may be added to the dried amino resin and the resultant mixture milled in any suitable manner to obtain a homogeneous blend.

When it is desired to use methylol polyacrylamide as the thermoplastic polymeric component of my modifier combinations, the methylol polyacrylamide may be introduced into the amino resin syrup as the dry powder or alternately a dry insolubilized methylol polyacrylamide may be swollen with several times its weight in water and introduced into the amino-resin syrup in the course of mixing with the polyester resin or with other components of the molding composition.

When the resinous mixtures of the present invention are employed in the preparation of thermosetting resin molding compositions, a filler, as well-known in the art, may be employed. The amount of filler employed will depend upon the ultimate use of the molding composition and properties sought and, therefore, may vary over wide ranges up to as high as 80% by weight, based on the total weight of the final molding composition.

Illustrative examples of fillers that may be incorporated into the molding composition are such as alpha-cellulose, wood flour, walnut shell flour, fibrous asbestos or decalcined variants, fiber glass, yarn cuttings, finely divided silicon carbide, carbon black, diatomaceous earth, slate dust, powdered or flaked mica, cloth cuttings (e.g., silk, rayon, wool, linen, cotton, nylon or cloth made from glass fibers or from polymeric or copolymeric acrylonitrile fibers, etc.), ground cork, silica, etc. Preferably, the amount of filler based on the total weight of the molding composition is in the order of about 30% by weight. For certain applications no filler need be present. Obviously, when one desires to take advantage of the excellent light color retention properties exhibited by the resinous compositions of this invention, the white or light colored fillers mentioned hereinabove should be used.

The filler may be incorporated into the resinous composition by any means known in the art. Thus, the amino resin syrup containing the dispersed polyacrylamide or methylol polyacrylamide and polyester may be dried, as for example by tray drying, vacuum concentrating or the like, to produce a dry composition. This dried composition may then be comminuted and combined with the filler, as for example in a ball mill or the like. Alternatively and preferably, the filler is combined with the amino-resin syrup containing the dispersed modifier material in a mixing operation. The homogeneously blended resin-impregnated filler is then dried to a desired volatile content, as for example in a continuous drier, and the material is then reduced to a desired particle size suitable for molding by conventional methods.

During the preparation of the molding compositions of this invention dyes, pigments and other colorants may be added for the preparation of colored molding compositions. If desired, mold lubricants such as zinc stearate and the like, curing agents such as phthalic anhydride, benzoyl peroxide, benzoic acid, tetrachlorophthalic anhydride and the like, as well as other additives may be combined with the resinous component during the formation of the molding composition.

The novel thermosetting resinous compositions of this invention may be shaped or formed by molding, extruding, laminating or the like at temperatures ranging, for example, from about 130° C. to 180° C. and at pressures varrying from about 1,000 to 10,000 p.s.i. They may be molded by compression, injection or transfer molding techniques well known in the art.

In order that the present invention may be more completely understood, the following examples are set forth in which all parts are parts by weight unless otherwise indicated. These examples are set forth primarily for the purpose of illustration and any specific enumeration of detail contained therein should not be interpreted as a limitation on the case except as indicated in the appended claims.

PREPARATION OF POLYACRYLAMIDE

This example illustrates a method for preparing a medium molecular weight grade of polyacrylamide (PAM). Into a suitable reaction vessel is charged the following:

| | Parts |
|---|---|
| Acrylamide | 51.8 |
| Demineralized water | 414.7 |
| Isopropyl alcohol | 7.76 |
| Potassium persulfate | 0.096 |

The monomer and water are warmed to 68° C. under a rapid stream of carbon dioxide. The alcohol and catalyst are added causing the reaction temperature to rise to 75–80° C. This temperature range is maintained for two hours. The resultant reaction product is a clear, colorless solution having a viscosity in the vicinity of 3500 cps. at 25° C. The average molecular weight of the polyacrylamide produced is about 400,000, as determined by the light scattering method.

PREPARATION OF DIGLYCERYL PHTHALATE 148 parts of phthalic anhydride and 184 parts of glycerol were heated with stirring in a suitable reaction vessel. Heating was gradual until a temperature of 215° C. was reached. The reaction mixture was then heated at 215–225° C. for 4 hours. The reaction product had an acid number of 9 and was in the form of a very viscous resin. This resin could be used with water to the extent of 60 parts per 100 parts of resin. It was readily soluble in ethanol and in a 1–1 mixture of water and ethanol. While the above shows the preparation of diglyceryl phthalate, the corresponding diglyceryl esters of other dicarboxylic acids may be prepared in a similar manner by simply altering the proportions of the reactants to take into account the molecular weight of the particular dibasic acids used. As indicated hereinabove, other dibasic acids may be used in place of the phthalic acid such as succinic, adipic, sebacic, azelaic, isophthalic, terephthalic, etc. Also, while the ratio of glycerol to phthalic acid was on the molecular basis of 2:1, respectively, in the preparation of this particular condensate, it is to be noted that suitable condensates which may be used in the practice of this invention may be formulated on the basis of approximately 1.5 moles of glycerol to 1 mol of the dibasic acid.

*Example 1*

An amino resin constituting the condensation product of formaldehyde with melamine wherein the mol ratio of formaldehyde to melamine is 1.3 is prepared as follows. Into a suitable reaction vessel equipped with a stirrer, thermometer and reflux condenser is charged 2279 parts demineralized water, 1000 parts of a 37% aqueous solution of formaldehyde (Formalin) and a sufficient quantity of one-half normal sodium hydroxide solution to effect an alkaline condition of pH 8.6. Thereupon, 1197 parts of melamine are added. Heat is then applied, and with stirring the reaction medium is raised from room temperature to 98–102° C. in approximately one hour. The reaction mixture is heated at reflux (98–102° C.) until a standard condition of hydrophobity is obtained which is indicated when 4 drops of the reaction medium, when added to 25 milliliters of water at 0–3° C., results in a solution having a blue haze. Thereupon, the resinous syrup is rapidly cooled to approximately 65° C. and vacuum concentrated at 23 inches vacuum (approximately 7″ Hg pressure) until 1946 parts of water are removed, thus resulting in a resinous syrup having 66% resin solids.

To a portion of the melamine resin syrup is added a sufficient amount of alpha-cellulose (sulfite wood cellulose) so as to yield a molding composition containing 30% of the filler and 70% resin. This composition was thoroughly mixed and then tray dried at 70° C.

To other portions of the melamine resin syrup described above were added modifiers consisting of diglyceryl phthalate, polyacrylamide and a combination of diglyceryl phthalate and polyacrylamide. The amount of modifier employed was the same in each instance, that is, 25% of the total resinous content. The types of diglyceryl phthalate and polyacrylamide were those described hereinabove. The diglyceryl phthalate was added as the neat resin to the melamine resin syrup and the polyacrylamide was added as a 10% solution in water. To the various modified syrups was added a sufficient quantity of chopped alpha-cellulose to yield a composition in each case which, on the solid basis, contained 70% resin and 30% filler. All of the modified compositions were thoroughly mixed before drying in the manner employed to dry the unmodified composition. To each of the dry, granular products was added 0.5% of its weight of zinc stearate and the mixture then ground to a suitable particle size for molding purposes. Each of the ground compositions was further dried at 50° C. to a moisure content as indicated in the following table and thereupon the flow characteristics of the respective compositions were determined.

| Composition | Modifier | | Percent $H_2O$ | FMF [1] (Inch) | General Molding Plasticity |
|---|---|---|---|---|---|
| | Type | Percent | | | |
| A (Control) | | 0 | 0 | .038 | Medium. |
| B | diglyceryl phthalate. | 25 | 0 | .042 | Do. |
| C | Polyacrylamide | 9 | 1.5 | .051 | Stiff. |
| D | do | 25 | 2.3 | .055 | Do. |
| E | {diglyceryl phthalate | 15 | | | |
| | Polyacrylamide | 10 | 0.6 | .036 | Medium. |

[1] FMF—flow mold flow value.

The data presented in the above Table I primarily shows the effect of various modifiers, including the combination of this invention upon the flow characteristics of the molding compositions. In determining the flow characteristics of the molding compositions, two types of tests were employed. One of the tests, which is commonly used to determine the plasticity of a molding composition, is a value obtained in a flow-mold-flow test which is conducted as follows:

A charge of 50 grams of the ground molding composition at 20–30° C. is placed in the center of the bottom platen of a compression molding press, both platens of which are at a temperature of 290±2° F. and so shaped and grooved as to produce a flat molded disc with concentric ridges ½″ apart. The bottom force is raised within 20 seconds to a point where the press gauge shows initial pressure on the material and within the next 15 sec. progressively increased pressure up to a force of 18 tons is applied and this is maintained during the cure time. At the end of the time required for cure, the piece is removed and cooled. The average measurement of the thickness of the piece taken in the ring, about 2¼″ from the center of the molded disc is recorded in mils or inches as the measure of plasticity. According to this test, a value in the order of 40 mils is considered as indicating a desired degree of plasticity for the molding composition. Values in the order of 30 or less are interpreted as indicating that the molding composition contains too much flow and values in the order of 50 mils or more indicate that the molding composition does not have an adequate degree of flow properties.

Usually, in conjunction with the flow-mold-flow test, a different observation of the flow characteristics of the molding composition is observed in a manner which seeks to appraise the general molding behavior of the plastic composition. In this latter test, a sample of the molding composition is molded in a tumbler mold and the number of tons pressure required to close the mold is determined. According to this test, values in the range of 20–25 tons are considered desirable and a composition having a value in this range is generally classified as having "medium" molding behavior. Values greater than 25 tons are considered undesirable and a composition having a value in excess of about 25 tons is termed "stiff." Also, a value from about 13 to 18 tons indicates that the composition has an undesirable degree of flow and such compositions are referred to as having a "free" molding behavior.

Thus, it can be seen that composition E containing the combination of diglyceryl phthalate and polyacrylamide in the ratio of 3:2, respectively, has what is considered to be an optimum degree of flow characteristics. It was determined that the flow characteristics of this composition, modified in accordance with this invention, were slightly better than those of the composition containing the diglyceryl phthalate alone as the modifier and vastly superior to those of compositions C and D which contain polyacrylamide solely as the modifier. Therefore, it was surprising that a combination of these modifiers as exemplified in composition E did not reflect an additive effect, which would have been the case if this composition had flow characteristics within the range of medium to stiff.

It will be seen from the data set forth in Table I that the moisture contents of the molding compositions, with the exception of C and D, were substantially nil. The moisture contents of the polyacrylamide-modified compositions were as low as could be obtained practically because of the hydrophilic effect resulting from the use of this modifier. A uniform moisture level is desirable when testing a number of compositions for flow characteristics because it is known that the water content of a molding composition directly affects its flow characteristics. Almost invariably, the higher moisture contents within the range that can be tolerated in molding compositions facilitates the flow properties of the composition. Therefore, it is somewhat significant that the polyacrylamide modified compositions, which were the only compositions in this series containing a significant amount of moisture, were still quite inferior with regard to flow properties.

Among the molded objects produced from the compositions shown in Table I major differences in appearance were noted. Thus a relatively opaque molded plastic was yielded by composition B with 25% diglyceryl phthalate. In other compositions with only 15% diglyceryl phthalate, not described in Table I, this opacity was reduced but the natural translucence characteristic of the base resin was lacking. Polyacrylamide in (C) was without effect in this respect. In (E) however with both modifiers present the appearance was very close to that attributable to the base resin alone and much improved over that expected from its diglyceryl phthalate content. Thus the polyacrylamide served to improve the appearance associated with the latter either through acting beneficially as a solvent for base resin and polyester or otherwise.

*Example 2*

In this example, the designated compositions are identical with the corresponding compositions of Example 1. The molded discs were prepared from the various compositions in an identical manner as employed in preparing the test specimens outlined in Example 1. The moldings were tested for dimensional stability characteristics by noting the shrinkage occurring in the molded plastic after aging at an elevated temperature for a prescribed length of time. The data obtained in these tests are set forth in the following Table II.

TABLE II

| Composition | Modifier | | Percent $H_2O$ | Aging Shrinkage [1] |
|---|---|---|---|---|
| | Type | Percent | | |
| A (Control) | | 0 | 0 | 3.5 |
| B | diglyceryl phthalate | 25 | 0 | 4.5 |
| D | Poly-acrylamide | 25 | 2.3 | 2.3 |
| E | Diglyceryl phthalate polyacrylamide | 15 | 2.0 | 1.5 |

[1] Shrinkage of molded plastic in mils per inch after aging 48 hours at 220° F.

It is to be noted from the above data that a melamine resin modified in accordance with this invention as exemplified in Composition E is markedly reduced in shrinkage tendencies. It is significant to note that while a diglyceryl phthalate modification increases somewhat the shrinkage characteristics of the composition over that obtained by the control, and a polyacrylamide modification somewhat decreases this shrinkage tendency over that observed in the control, the combination of these two ingredients as exemplified in Composition E results in an improvement in shrinkage rather than providing an average effect which might be expected. It is known in the molding art that the moisture content of the molding composition directly affects aging shrinkage. However, the composition modified in accordance with this invention, even though containing significantly more moisture than the control, nevertheless yields a molded plastic having vastly improved dimensional stability as measured by aging shrinkage.

*Example 3*

This example illustrates the effect of a melamine resin modifier consisting of diglyceryl phthalate and polyacrylamide with regard to a type of dimensional stabiilty which is measured by observing the molding composition's resistance to cracking around mold inserts.

A resinous syrup consisting of a melamine-formaldehyde condensate having a formaldehyde to melamine ratio of 1.5 was made in a similar manner as employed in preparing the condensate described in Example 1. To this syrup was added combinations of diglyceryl phthalate and polyacrylamide (molecular weight 500,000) so as to yield syrups whose solids contents contain the modifier at 25, 35 and approximately 45% levels. The ratio of diglyceryl phthalate to polyacrylamide was 15:10, 25:10 and 23.6:20, respectively. To each of these modified syrups was added a sufficient amount of alpha cellulose so as to yield a composition containing 70% resin and 30% of the filler. The compositions were then tray-dried to a moisture content of approximately 2% in the manner employed in Example 1. Two control compositions were included in this test. One control contained the unmodified melamine resin condensate solely as the resinous component, and the other contained as the resinous binder a combination of the melamine condensate and polyacrylamide wherein the proportions of melamine resin to polyacrylamide were 85:15, respectively.

The various molding compositions were molded in the form of cylinders 2" in diameter and ½" in height containing solid steel inserts 1¾" in diameter and also ½" in height. The curing temperature employed was 170° C. Each composition was cured to a point of cure which permits the composition to withstand immersion in boiling water for 30 minutes without evidence of any attack by water. The time of cure required to secure this degree of resistance to boiling water depend upon the particular composition and varied from about 2 minutes to 3½ minutes at the indicated temperature.

All of the molding compositions were subjected to a cracking test which was made up of three parts. Part one of the cracking test consisted of subjecting the molded plastic containing the insert to three cycles of alternately heating and conditioning at room temperature. Each cycle consisted of 16 hours at 150° C. followed by a conditioning period of 8 hours at room temperature. Part two of the cracking test, which was commenced immediately subsequent to the observance of part one, consisted of storing the test specimens six days at 150° C. Part three consisted of storing the test specimens at room temperature for one day.

In the above test, all of the compositions containing the combination of diglycerol phthalate and polyacrylamide as the modifier withstood all parts of this test, whereas the two controls each showed two cracking failures for two test specimens after the first cycle of part one of the test had elapsed.

*Example 4*

A polyester which may be referred to as dipentaerythritol sebacate was prepared by the ester-alcohol exchange reaction. To 1090 parts of pentaerythritol, 230 parts dimethyl sebacate were added and the mixture heated to 200–230° C. where the reaction took place. As methanol distilled, additional dimethyl sebacate was added for a total of 920 parts. The product assumed the form of a soft balsam with an acid number of 0.04.

This ester was added as a 60% solution in water-ethanol to a melamine resin syrup of the type described in Example 1. Polyacrylamide was then added to the syrup and dissolved by mixing. Mixing with cellulose and final processing were as described in Example 1. The modifier proportions were 10% dipentaerythritol sebacate and 10% polyacrylamide. In this case as in preceding ones the two modifiers had a mutually beneficial effect and the properties of the molded product were improved beyond the point where they could be attributed to an additive effect.

*Example 5*

An aqueous urea-formaldehyde syrup was prepared by low temperature reaction in the molar ratio of formaldehyde to urea of 1.3 at a pH value of approximately 7.5 and at about 60% solids. When the reaction had advanced to where the free formaldehyde was 8.0%, two modifiers were blended with it. Diglyceryl phthalate was dissolved directly without presolution and polyacrylamide was added as a 15% solids solution. A small amount of an alkanolamine phthalate buffer was added to insure a pH value of about 8.5. The modifier resin solution was mixed with sulfite cellulose and the intermediate dried at 65° C. Grinding with mold lubricant and curing agent completed the preparation. In this instance 7.5% diglyceryl phthalate and 7.5% polyacrylamide were used based on the resinous content and the ratio of total resin to cellulose was 65:25. The molding composition had very good high frequency prewarming properties, unusual flow characteristics in transfer molding, very good dimensional stability and low change in dimensional stability with increase in moisture content of the molding composition.

I claim:
1. A thermosetting resinous composition capable of being heat-cured to a substantially insoluble and infusible product having a high degree of dimensional stability comprising a substantially homogeneous blend of from about 55 to 95 parts by weight of (1) a heat-curable resinous reaction product prepared by condensing formaldehyde with an amidogen compound selected from the group consisting of melamine and urea, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) a material selected from the group consisting of polyacrylamide and methylol polyacrylamide, wherein the weight ratio of said (A) to said (B) is from about 25:75 to 75:25, respectively.

2. A thermosetting resinous composition capable of bein heat-cured to a substantially insoluble and infusible product having a high degree of dimensional stability comprising a substantially homogeneous blend of from about 55 to 95 parts by weight of (1) a heat-curable resinous reaction product prepared by condensing formaldehyde with melamine, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) polyacrylamide, wherein the weight ratio of said (A) to said (B) is from about 25:75 to 75:25, respectively.

3. A thermosetting resinous composition capable of being heat-cured to a substantially insoluble and infusible product having a high degree of dimensional stability comprising a substantially homogeneous blend of from about 55 to 95 parts by weight of (1) a heat-curable resinuous reaction product prepared by condensing formaldehyde with melamine, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) methylol polyacrylamide, wherein the weight ratio of said (A) to said (B) is from about 25:75 to 75:25, respectively.

4. A thermosetting resinous composition capable of being heat-cured to a substantially insoluble and infusible product having a high degree of dimensional stability comprising a substantially homogeneous blend of from about 55 to 95 parts by weight of (1) a heat-curable resinous reaction product prepared by condensing formaldehyde with urea, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) polyacrylamide, wherein the weight ratio of said (A) to said (B) is from about 25:75 to 75:25, respectively.

5. A thermosetting resinous composition capable of being heat-cured to a substantially insoluble and infusible product having a high degree of dimensional stability comprising a substantially homogeneous blend of from about 55 to 95 parts by weight of (1) a heat-curable resinous reaction product prepared by condensing formaldehyde with urea, and correspondingly from about 45 to 5 parts by weight of (1) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) methylol polyacrylamide, wherein the weight ratio of said (A) to said (B) is from about 25:75 to 75:25, respectively.

6. A thermosetting resinous composition capable of being heat-cured to a substantially insoluble and infusible product having a high degree of dimensional stability comprising a substantially homogeneous blend of from about 70 to 85 parts by weight of (1) a heat-curable resinous reaction product prepared by condensing formaldehyde with melamine, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) polyacrylamide, wherein the weight ratio of said (A) to said (B) is from about 40:60 to 60:40, respectively.

7. A thermosetting resinous composition capable of being heat-cured to a substantially insoluble and infusible product having a high degree of dimensional stability comprising a substantially homogeneous blend of from about 70 to 85 parts by weight of (1) a heat-curable resinous reaction product prepared by condensing formaldehyde with melamine, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) methylol polyacrylamide, wherein the weight ratio of said (A) to said (B) is from about 40:60 to 60:40, respectively.

8. A thermosetting resinous composition capable of being heat-cured to a substantially insoluble and infusible product having a high degree of dimensional stability comprising a substantially homogeneous blend of from about 70 to 85 parts by weight of (1) a heat-curable resinous reaction product prepared by condensing formaldehyde with urea, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) polyacrylamide, wherein the weight ratio of said (A) to said (B) is from about 40:60 to 60:40, respectively.

9. A thermosetting resinous composition capable of being heat-cured to a substantially insoluble and infusible product having a high degree of dimensional stability comprising a substantially homogeneous blend of from about 70 to 85 parts by weight of (1) a heat-curable resinous reaction product prepared by condensing formaldehyde with urea, and correspindingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) methylol polyacrylamide, wherein the weight ratio of said (A) to said (B) is from about 40:60 to 60:40, respectively.

10. A substantially insoluble and infusible product obtained by heat-curing a thermosetting resinous composition comprising a substantially homogeneous blend of from about 55 to 95 parts by weight of (1) a heat-curable resinous reaction product prepared by condensing formaldehyde with an amidogen compound selected from the group consisting of melamine and urea, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) a material selected from the group consisting of polyacrylamide and methylol polyacrylamide, wherein the weight ratio of said (A) to said (B) is from about 25:75 to 75:25, respectively.

11. A substantially insoluble and infusible product obtained by heat-curing a thermosetting resinous composition comprising a substantially homogeneous blend of from about 55 to 95 parts by weight of (1) a heat-curable resinous reaction product prepared by condensing formaldehyde with melamine, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) polyacrylamide, wherein the weight ratio of said (A) to said (B) is from about 25:75 to 75:25, respectively.

12. A substantially insoluble and infusible product obtained by heat-curing a thermosetting resinous composition comprising a substantially homogeneous blend of from about 55 to 95 parts by weight of (1) a heat-curable resinous reaction product prepared by condensing formaldehyde with melamine, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) methylol polyacrylamide, wherein the weight ratio of said (A) to said (B) is from about 25:75 to 75:25, respectively.

13. A substantially insoluble and infusible product obtained by heat-curing a thermosetting resinous composition comprising a substantially homogeneous blend of from about 55 to 95 parts by weight of (1) a heat-curable resinous reaction product prepared by condensing formaldehyde with urea, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) polyacrylamide, wherein the weight ratio of said (A) to said (B) is from about 25:75 to 75:25, respectively.

14. A substantially insoluble and infusible product obtained by heat-curing a thermosetting resinous composition comprising a substantially homogeneous blend of from about 55 to 95 parts by weight of (1) a heat-curable resinous reaction product prepared by condensing formaldehyde with urea, and correspondingly from about 45 to 5 parts by weight of (2) a combination of (A) a polyester prepared by esterifying an aliphatic polyhydric alcohol with a dicarboxylic acid on the basis of from about 2 to 6 mol equivalents of hydroxyl groups as represented by said alcohol per mol equivalent of carboxyl groups as represented by said acid until said polyester has an acid number of less than about 10, and (B) methylol polyacrylamide, wherein the weight ratio of said (A) to said (B) is from about 25:75 to 75:25, respectively.

15. A substantially insoluble and infusible product obtained by heat-curing a thermosetting resinous composition comprising a substantially homogeneous blend of from about 70 to 85 parts by weight of (1) a heat-curable resinous reaction product prepared by condensing formaldehyde with melamine, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) polyacrylamide, wherein the weight ratio of said (A) to said (B) is from about 40:60 to 60:40, respectively.

16. A substantially insoluble and infusible product obtained by heat-curing a thermosetting resinous composition comprising a substantially homogeneous blend of from about 70 to 85 parts by weight of (1) a heat-curable resinous reaction product prepared by condensing formaldehyde with melamine, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) methylol polyacrylamide, wherein the weight ratio of said (A) to said (B) is from about 40:60 to 60:40, respectively.

17. A substantially insoluble and infusible product obtained by heat-curing a thermosetting resinous composition comprising a substantially homogeneous blend of from about 70 to 85 parts by weight of (1) a heat-curable resinous reaction product prepared by condensing formaldehyde with urea, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) polyacrylamide, wherein the weight ratio of said (A) to said (B) is from about 40:60 to 60:40, respectively.

18. A substantially insoluble and infusible product obtained by heat-curing a thermosetting resinous composition comprising a substantially homogeneous blend of from about 70 to 85 parts by weight of (1) a heat-curable resinous reaction product prepared by condensing formaldehyde with urea, and correspondingly from about 30 to 15 parts by weight of (2) a combination of (A) a polyester prepared by esterifying glycerol with phthalic acid on the basis of from about 1.5 to 4.0 mols of glycerol per mol of phthalic acid until said polyester has an acid number of less than about 10, and (B) methylol polyacrylamide, wherein the weight ratio of said (A) to said (B) is from about 40:60 to 60:40, respectively.

References Cited in the file of this patent

UNITED STATES PATENTS

| | | |
|---|---|---|
| 2,479,090 | Wohnsiedler | Aug. 16, 1949 |
| 2,546,841 | Wohnsiedler | Mar. 27, 1951 |
| 2,862,901 | Suen et al. | Dec. 2, 1958 |
| 2,915,486 | Shelley | Dec. 1, 1959 |
| 2,940,945 | Christenson et al. | June 14, 1960 |